T. R. ARNOLD.
WATER SUPPLY SYSTEM.
APPLICATION FILED MAY 23, 1918.

1,304,529.

Patented May 27, 1919.
3 SHEETS—SHEET 1.

WITNESSES
E. E. Wells
A. H. Opsahl

INVENTOR
Thomas Randolph Arnold
BY HIS ATTORNEYS
Williamson Merchant

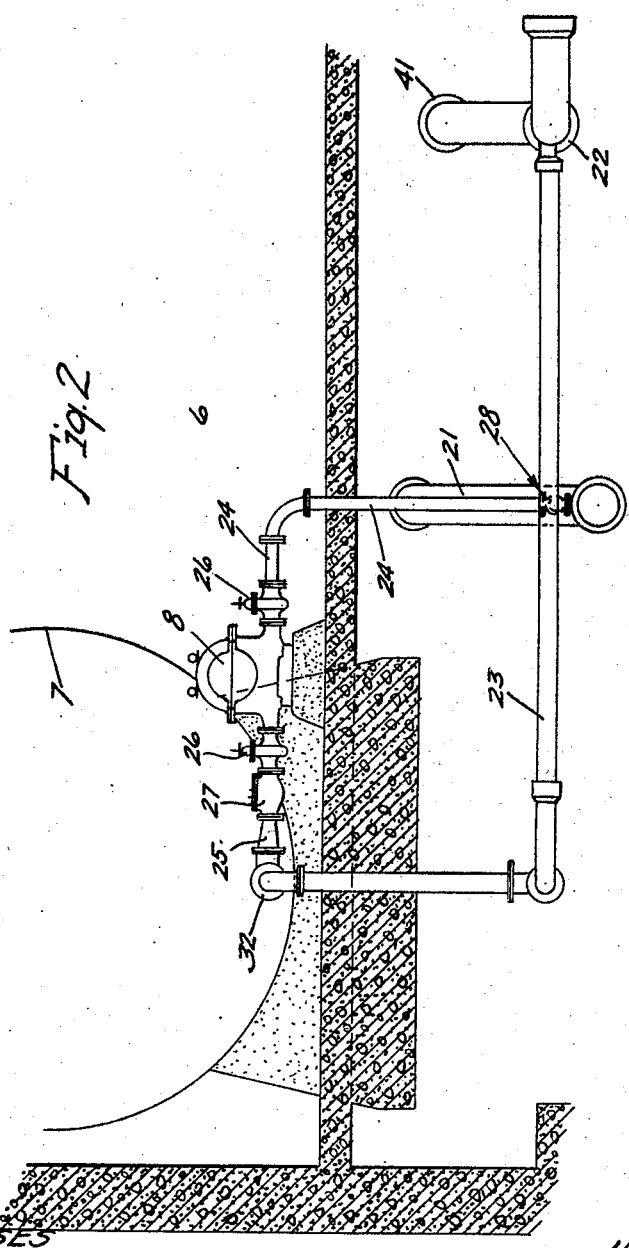

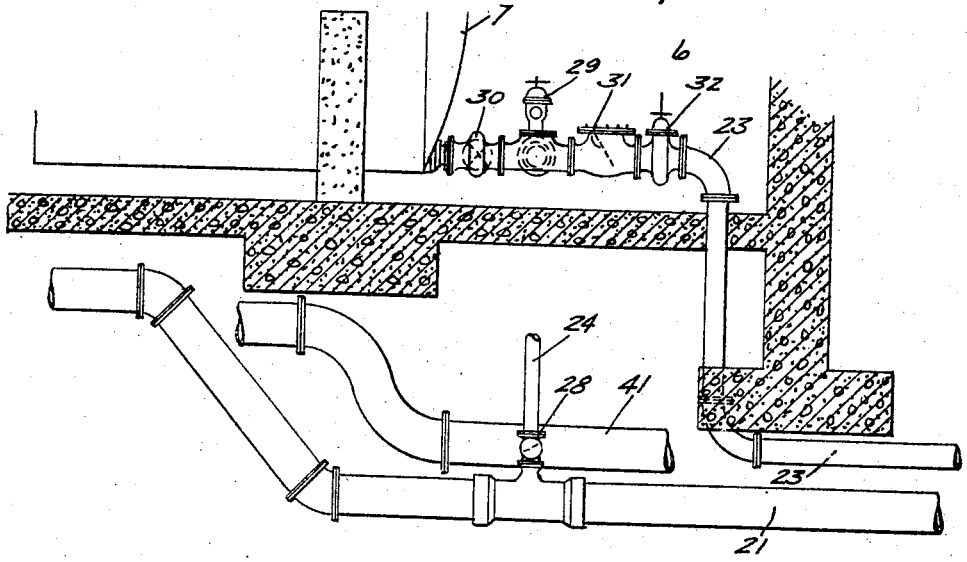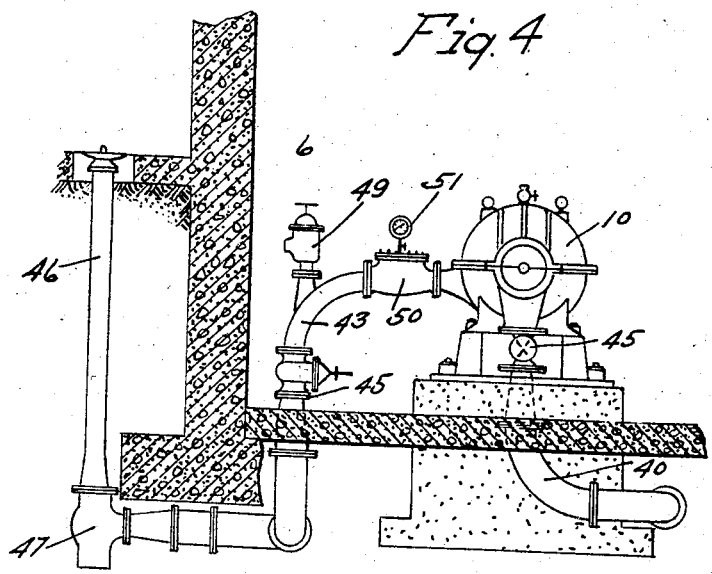

UNITED STATES PATENT OFFICE.

THOMAS RANDOLPH ARNOLD, OF LANGDON, NORTH DAKOTA.

WATER-SUPPLY SYSTEM.

1,304,529.  Specification of Letters Patent.  Patented May 27, 1919.

Application filed May 23, 1918. Serial No. 236,204.

*To all whom it may concern:*

Be it known that I, THOMAS RANDOLPH ARNOLD, a citizen of the United States, residing at Langdon, in the county of Cavalier and State of North Dakota, have invented certain new and useful Improvements in Water-Supply Systems; and I do hereby declare the following to be a full, clear, and exact description of the invention, such as will enable others skilled in the art to which it appertains to make and use the same.

My invention has for its object to provide a highly efficient water supply system which includes, together with the usual valves, fittings, pipes and hydrants, a suitable source of supply (preferably underground reservoirs), high and low pressure producing pumps, motors, a hydro-pneumatic tank, and an automatic controller and other electrical apparatus, said elements being so connected and assembled as to deliver water in large quantities, at a high pressure, for fire purposes, automatically cutting out, resting and protecting the low pressure producing mechanism while said high pressure producing mechanism is in operation, and at a much lower, cheaper and controllable pressure for ordinary or household purposes.

For ordinary or household service the automatic controlling apparatus will start the low pressure pump, when the pressure in the system reaches a predetermined low head, and stop said pump when the pressure in the system reaches a predetermined high head. The low pressure producing mechanism or unit will continue to perform its function practically without attention and the automatic controlling apparatus may be set to cause said low pressure unit to deliver water at any desired elevation according to the existing heights of buildings.

For fire purposes the high pressure producing mechanism, which may include one or more units, will, as previously stated, deliver large quantities of water, and the starting of said mechanism will, by the increased pressure in the system, automatically cut out and bring to rest, the low pressure unit. The high pressure unit or units may be independently started and stopped, at will, and when stopped, will allow the low pressure mechanism to automatically resume its duties upon return of the pressure to a predetermined low head.

Among the many advantages of my improved water system is its high efficiency of fire service; its cheapness of daily operation by adjustability to varying elevations; its continuous automatic operation at prearranged pressure; its protection of the low pressure unit when the high pressure unit is in operation; its automatic resumption of continuous household service immediately upon cessation of high pressure functioning; its extreme cheapness, safety and reliability.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 2 is a view partly in elevation and partly in vertical section taken on the line 2—2 Fig. 1;

Fig. 3 is a view partly in elevation and partly in vertical section taken on the line 3—3 of Fig. 1; and Fig. 4 is a view partly in elevation and partly in vertical section taken on the line 4—4 of Fig. 1.

Figure 1:
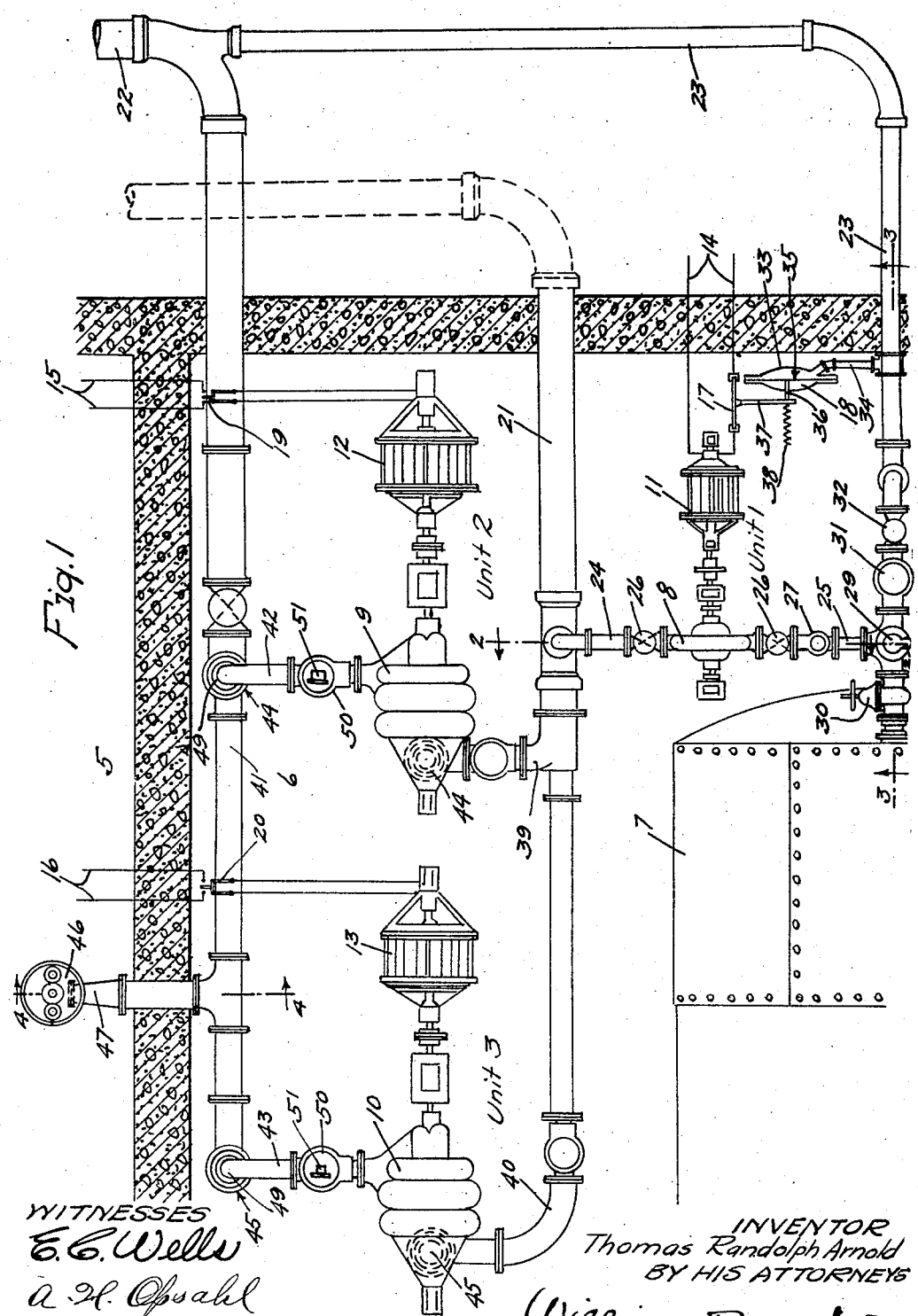
Figure 1 is a view partly in plan and partly in horizontal section diagrammatically illustrating the invention.

The numeral 5 indicates a fire hall having an adjoining room 6 in which is mounted on suitable beds a hydro-pneumatic tank 7, a low pressure producing pump 8 and high pressure producing pumps 9 and 10. The pumps 8, 9 and 10 are independently and respectively operated by motors 11, 12 and 13 that are directly connected thereto. Said pumps 8, 9 and 10, together with their respective motors, will hereinafter be referred to as units 1, 2 and 3, respectively.

Electric current feed wires 14, 15 and 16 lead from a central station, not shown, to the motors 11, 12 and 13, respectively. Interposed in one of the wires 14, is the switch 17 of an automatic controller 18, and manually operated switches 19 and 20 are interposed in the wires 15 and 16, respectively. The pumps, motors and automatic controller may be of any suitable make. The switches 19 and 20 may be mounted in starting boxes, not shown, and those boxes, together with the automatic controller, may be secured in convenient places on walls of the room 6.

The numeral 21 indicates a water supply pipe leading from any suitable source, such as underground reservoirs, with its discharge end located under the floor of the room 6. A water distributing main 22 has its receiving end located just outside of the room 6 and a pipe 23 connects the tank 7 to the receiving end of said main. The intake of the low pressure pump 8 is connected to the water supply pipe 21 by a pipe 24, and a pipe 25 connects the discharge of said pump to the pipe 23, just forward of the tank 7. Interposed in pipes 24 and 25, are two cut-off valves 26, one at the intake and the other at the discharge of the pump 8. By closing said valves 26, pump 8 may be removed without wastage of water, or, in any way, interfering with the functioning of the balance of the water supplying system. The check valve 27 is arranged to relieve the low pressure pump 8 from the constant pressure, which is upon the tank 7 and distributing pipes or mains.

To facilitate the priming of the low pressure pump for the first initial start thereof, in the event that the hydraulic head in the reservoir or other source of supply is below the highest point of said low pressure pump, a check valve 28 is interposed in the pipe 24 between the supply pipe 21 and cut-off valve 26, at the intake of the low pressure pump, and arranged to prevent a flow of water from said pump back to the supply pipe.

At the junction of the pipes 23 and 25 is a relief valve 29, of suitable construction, set to open, at a predetermined pressure, and discharge superfluous water thus protecting the tank 7 from undue and injurious strains. A cut-off valve 30 interposed in the pipe 23 between the relief valve 29 and tank 7 may be closed, at will, to permit said tank to be removed or repaired without interfering in any way with the action of the balance of the water supply system. Interposed in the pipe 23, between the relief valve 29 and main 22, is a check valve 31, arranged to close immediately upon the increase of pressure in the pipe 23, produced by the high pressure pumps 9 and 10, thereby protecting the tank 7 against a rise of pressure above normal. This check valve will release the water in the tank 7 the instant the hydraulic head in the pipe 22 reaches the normal pressure, thus permitting again the functioning of the low pressure mechanism in unison. A cut-off valve 32 is interposed in the pipe 23, between the check valve 31 and main 22, and when closed will cut off all of the low pressure mechanism, thereby permitting the same to be removed or repaired without wasting any water even though the high pressure system may be functioning.

The automatic controller, diagrammatically illustrated, comprises briefly a casing 33, the chamber of which is connected by a pipe 34 to the pipe 23, at a point between the pipe 22 and cut-off valve 32. Within the casing 33, is a diaphragm 35 which is subject to the water pressure in the mains at all times. A plunger 36, carried by the diaphragm and working through the casing 33, is arranged to engage a lever 37, forming a part of the switch 17, and move said switch into an open position, when the pressure in the mains reaches a predetermined high head, and thereby stops the motor of the low pressure pump 8. A spring 38 is arranged to oppose the action of the diaphragm 35 and close the switch 17, and thereby start the low pressure pump 8, when the pressure drops to a predetermined low head. By adjusting the spring 38, the range of water pressure may be varied, at will. It is, of course, understood that any other suitable regulator for the low pressure unit may be substituted for the one illustrated.

The intakes of the high pressure pumps are connected with the supply pipe 21 by pipes 39 and 40, respectively. Extending from within the room 6 to the beginning of the main 22, is a pipe 41. Pipes 42 and 43 connect the discharge of the pumps 9 and 10, respectively, to the pipe 41. Interposed in the pipes 39 and 42, are cut-off valves 44 and interposed in the pipes 40 and 43, are the cut-off valves 45. In closing either sets of valves 44 and 45, the respective pumps, located therebetween, may be repaired or removed without wasting any water, or in any way affecting the other units of the system.

Interposed in the pipe 41, between the distributing main 22 and pipe 42, is a cut-off valve 48, which, upon being closed, prevents the passage of all water from the pumps 9 and 10 into the distributing main 22. The hydrant 46, located in the fire hall 5, is connected to the pipe 41, at a point between the pipe 43 and cut-off valve 48. By closing the valve 48, all of the water from either of the pumps 9 and 10, or both, may be delivered to the hydrant 46.

Each pipe 42 and 43, at points just above the cut-off valves 44 and 45, is provided with a relief valve 49, so set as to open up under an excessive rise of pressure in the mains. Check valves 50 are interposed in the pipes 42 and 43, between the pumps 9 and 10 and relief valves 49, to prevent a return flow of water from said pumps to the supply pipe 21. The check valves 50 are each provided with a pressure gage 51, which indicates, at all times, the existing pressure in the system. By-passes, not shown, will, in actual practice, be so tapped into the valves 50 as to permit automatic priming of the pumps 9 and 10 from the continuous household supply, when deemed advisable.

*Operation.*

In the event that the hydraulic head in the reservoir is below the highest point of the low pressure pump (unit 1), then the pump 8 will have to be primed to make the first initial start. Check valve 28 facilitates the priming of the pump, as previously stated.

Immediately upon the electric current entering the automatic controller 18 from the central station, the general or household service (unit 1) begins to perform its functions, delivering water into the mains.

Water is then drawn from the supply pipe 21 by the low pressure pump 8, and delivered thereby through the pipe 23 to the pipe 22, which is the beginning of the general distribution. This process continues until the desired pressure, for which the automatic controller 18 is set, has been reached, then unit 1 will be stopped by the automatic action of said controller.

Tank 7 being connected with the low pressure pump 8 receives its quota of water simultaneously with the mains and is at the same time bearing the same pressure as said mains. When unit 1 is automatically stopped, the tank 7 begins to yield up its water until its pressure is reduced to the point at which the automatic controller 18 is set to close the switch 17. The valve 28 closes immediately with the stopping of the unit 1, thus holding the pump 8 in a prime condition. As soon as the switch 17 is closed, unit 1 resumes its function and the above described process is indefinitely and automatically repeated. By means of the automatic controller, the pressure range may be varied at will. Whenever the low pressure pump 8 comes to rest, the valve 27 closes and relieves said pump from the constant pressure which is in the tank and mains.

Normally the circuits 15 and 16 are broken by the switches 19 and 20. In case of fire, either unit 2 or 3, or both, may be started by closing the switches 19 and 20. When the pumps 9 and 10 are operating, water is drawn thereby from the supply pipe 21 and delivered into the distributing main 22 through the pipe 41 and also to the hydrant 46 through the pipe 47. As previously stated, all of the water from units 2 and 3 may be delivered to the hydrant 43 by closing the valve 45.

What I claim is:—

1. The combination with a water supply system including a suitable source of supply, and a distributing main, of a low pressure pump and a high pressure pump arranged to draw water from the source of supply and deliver the same into the distributing main, means for starting and stopping the high pressure pump, at will, and an electrically operated controller for automatically stopping the low pressure pump when the high pressure pump is started.

2. The combination with a water supply system including a suitable source of supply, and a distributing main, of a low pressure pump and a high pressure pump arranged to draw water from the source of supply and deliver the same into the distributing main, means for starting and stopping the high pressure pump, at will, a controller for automatically stopping the low pressure pump when the high pressure pump is started, and a back pressure check valve arranged to protect the low pressure pump against the water pressure in the distributing main.

3. The combination with a water supply system including a suitable source of supply, and a distributing main, of a low pressure pump and a high pressure pump arranged to draw water from the source of supply and deliver the same into the distributing main, means for starting and stopping the high pressure pump, at will, a controller for automatically stopping the low pressure pump when the high pressure pump is started, and a check valve arranged to prevent a backward flow of water from the low pressure pump.

4. The combination with a water supply system including a suitable source of supply, a distributing main, and a storage tank connected to the distributing main, of a low pressure pump arranged to draw water from the source of supply and deliver the same into the distributing main and tank, a high pressure pump arranged to draw water from the source of supply and deliver the same into the distributing main, means for starting and stopping the high pressure pump, at will, a back pressure check valve arranged to protect the low pressure pump and tank against the water pressure in the distributing main, and a controller for automatically stopping the low pressure pump when the high pressure pump is started.

5. The combination with a water supply system including a suitable source of supply, and a distributing main, of a low pressure pump and a high pressure pump arranged to draw water from the source of supply and deliver the same into the distributing main, means for starting and stopping the high pressure pump, at will, and an automatic controller for starting the low pressure pump when the pressure in the distributing main reaches a predetermined low head for stopping said low pressure pump when the pressure in the distributing main reaches a predetermined high head.

6. The combination with a water supply system including a suitable source of supply, and a distributing main, of a low pressure pump and a high pressure pump arranged to draw water from the source of supply and deliver the same into the distributing main, means for starting and stopping the high pressure pump, at will, an automatic controller for starting the low pressure pump when the pressure in the distributing main reaches a predetermined low head for stopping said low pressure pump when the pressure in the distributing main reaches a predetermined high head, a hydrant, a pipe connecting the hydrant to the high pressure pump, and a valve operative at will, to cut off the high pressure pump and hydrant from the distributing main.

7. The combination with a water supply system including a suitable source of supply, a distributing main, and a storage tank connected to the distributing main, of a low pressure pump arranged to draw water from the source of supply and deliver the same into the distributing main and tank, a back pressure check valve arranged to protect the tank and low pressure pump against the water pressure in the distributing main, a high pressure pump arranged to draw water from the source of supply and deliver the same into the distributing main, means for starting and stopping the high pressure pump, at will, and an automatic controller for starting the low pressure pump when the pressure in the distributing main and tank reaches a predetermined low head and for stopping said low pressure pump when the pressure in the distributing main reaches a predetermined high head.

In testimony whereof I affix my signature in presence of two witnesses.

THOMAS RANDOLPH ARNOLD.

Witnesses:
  EDWARD J. FOX,
  THOMAS DEVANEY.

Copies of this patent may be obtained for five cents each, by addressing the "Commissioner of Patents, Washington, D. C."